US007007382B2

(12) United States Patent
Mantel

(10) Patent No.: US 7,007,382 B2
(45) Date of Patent: Mar. 7, 2006

(54) SLOT MACHINING

(75) Inventor: Blake M. Mantel, Newington, CT (US)

(73) Assignee: United Technologies Corporation, Hartford, CT (US)

(*) Notice: Subject to any disclaimer, the term of this patent is extended or adjusted under 35 U.S.C. 154(b) by 433 days.

(21) Appl. No.: 10/627,153

(22) Filed: Jul. 24, 2003

(65) Prior Publication Data

US 2005/0015983 A1 Jan. 27, 2005

(51) Int. Cl.
*B23P 15/04* (2006.01)
*B21K 25/00* (2006.01)

(52) U.S. Cl. ........................ 29/889.2; 29/889; 29/557; 29/558; 416/219 R

(58) Field of Classification Search ............... 29/889.2, 29/889.21, 889, 557, 558; 416/219 R; 407/42, 407/53, 54, 60
See application file for complete search history.

(56) References Cited

U.S. PATENT DOCUMENTS

| | | | | |
|---|---|---|---|---|
| 1,614,558 A * | 1/1927 | Kasley | ....................... | 409/131 |
| 4,537,538 A * | 8/1985 | Mitamura et al. | .......... | 409/217 |
| 5,567,116 A * | 10/1996 | Bourcier | ................. | 416/219 R |
| 5,931,616 A | 8/1999 | Daub | | |
| 6,302,651 B1 | 10/2001 | Kildea et al. | | |
| 6,322,296 B1 * | 11/2001 | Wetli et al. | .................... | 407/42 |
| 6,883,234 B1 * | 4/2005 | Packman et al. | .......... | 29/889.2 |

FOREIGN PATENT DOCUMENTS

| | | |
|---|---|---|
| DE | 30 06 645 | 9/1981 |
| JP | 58-202709 | * 11/1983 |
| JP | 58-217233 | * 12/1983 |
| JP | 06-270006 | * 9/1994 |
| JP | 2000-326133 | * 11/2000 |

OTHER PUBLICATIONS

S.L. Soo et al., Point Grinding of Nickel-Based Superalloys, Industrial Diamond Review, Feb. 2002, pp. 109-116.

* cited by examiner

*Primary Examiner*—Eric Compton
(74) *Attorney, Agent, or Firm*—Bachman & LaPointe, P.C.

(57) ABSTRACT

A method for cutting a blade root retention slot in a turbine engine disk element includes forming a precursor slot in the element. The precursor slot has first and second sidewalls and a base. A rotating bit is passed through the precursor slot to machine the base. The bit rotates about an axis off-normal to a direction of passing.

17 Claims, 4 Drawing Sheets

502
24'''
25'''
29A
29B
30'''
30
520
512
122
120
124
θ
126

SLOT MACHINING

BACKGROUND OF THE INVENTION (1) Field of the Invention

The invention relates to machining. More particularly, the invention relates to the machining of blade attachment slots in turbomachine disks.

(2) Description of the Related Art

In turbomachines such as gas turbine engines, the blades of fan, compressor, and turbine sections may be secured to separate disks. One attachment means involves providing blade roots having a convoluted section complementary to a convoluted section of slots in the disk periphery. An exemplary configuration involving a convoluted profile that generally increases in transverse dimension from the slot base toward its opening is called a fir tree configuration. A number of methods have been used or proposed for forming the slots. Exemplary methods are discussed in S. L. Soo et al., "Point Grinding of Nickel-Base Superalloys", Industrial Diamond Review, February 2002, pages 109–116.

SUMMARY OF THE INVENTION

Accordingly, one aspect of the invention involves a method for cutting a blade root retention slot in a turbine engine disk element. A precursor slot is formed in the element. The precursor slot has first and second sidewalls and a base. Subsequent to the forming, a convoluted profile is machined into the first and second sidewalls. Subsequent to the machining, a rotating bit is passed through the precursor slot to machine the base, the bit rotating about an axis off-normal to a direction of the passing.

In various implementations, the machining may broaden and deepen the base or, alternatively, the machining may leave at least a first portion of the base intact from the forming. The forming may involve machining with a grinding wheel rotating about a wheel axis essentially perpendicular to a direction of passing and essentially circumferential to a central longitudinal axis of the disk element. The machining may involve machining with a profiling bit having a convoluted longitudinal profile complementary to the convoluted profile of the slot sidewalls. The passing may smooth transitions between the first and second sidewalls and the base. During the passing, the bit axis may essentially lie along a radial plane of the disk element at an angle of between 60° and 85° relative to the direction of its passing. During its passing, the bit axis may be inclined relative to the direction of its passing. The forming may involve machining with a grinding wheel having portions of different diameters for forming the precursor slot with the first and second sidewalls as stepped sidewalls. The passing may increase an outward concavity of the base.

Another aspect of the invention involves a method for cutting a blade retention slot in a turbine disk engine element. A precursor slot is formed in the element having first and second sidewalls and a base. Subsequent to the forming, a rotating bit is passed through the precursor slot to machine the base, the bit rotating about an axis off-normal to a direction of the passing.

In various implementations, the bit may be an abrasive bit. The bit may have a doubly convex surface portion used to machine the base. The forming may comprise grinding with a grinding wheel. The forming may comprise grinding with a series of grinding wheels of different widths. The axis may be between 5° and 30° off-normal to the direction of passing. The axis may be inclined relative to the direction of passing.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
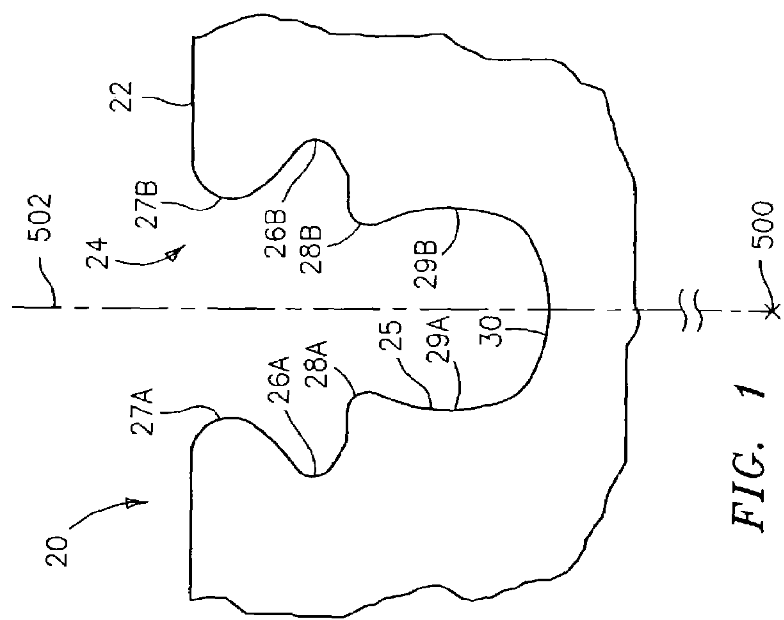
FIG. 1 is a partial longitudinal view of a blade attachment disk according to principles of the invention.

FIG. 1 shows a disk 20 having a central longitudinal axis 500 and a circumferential perimeter 22. Extending radially inward from the perimeter are a circumferential array of firtree blade attachment slots 24 each defined by on surface 25 forming the sidewalls and base of the slot. In the exemplary embodiment, each slot 24 extends along a symmetry plane 502 which may be a longitudinal radial plane through the axis 500 or may be at an angle to the axis 500. Each slot 24 has a convoluted profile for receiving a complementary root or button of a blade (not shown) to secure the blade to the disk against centrifugal forces associated with rotation of the disk about its axis 500. The exemplary slot has two relatively wide portions respectively distally (radially inward) of associated relatively narrow portions. In the exemplary embodiment, an outboard wide portion is defined between sidewall portions 26A and 26B of the surface 25 on either side of the plane 502. Radially outboard thereof the associated relatively narrow portion is formed between sidewall surface portions 27A and 27B. Radially inboard thereof is a relatively narrow portion defined by sidewall surface portions 28A and 28B. Yet further inboard, the second relatively wide portion (although not as wide as the first) is defined by sidewall surface portions 29A and 29B with a base 30 extending therebetween in a smooth continuously curving fashion.

Figure 2:
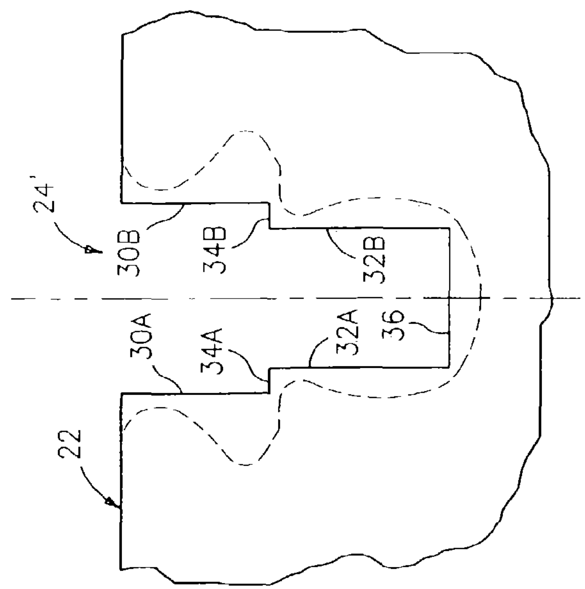
FIG. 2 is a view of a first precursor of the disk of FIG. 1.
Figure 3:
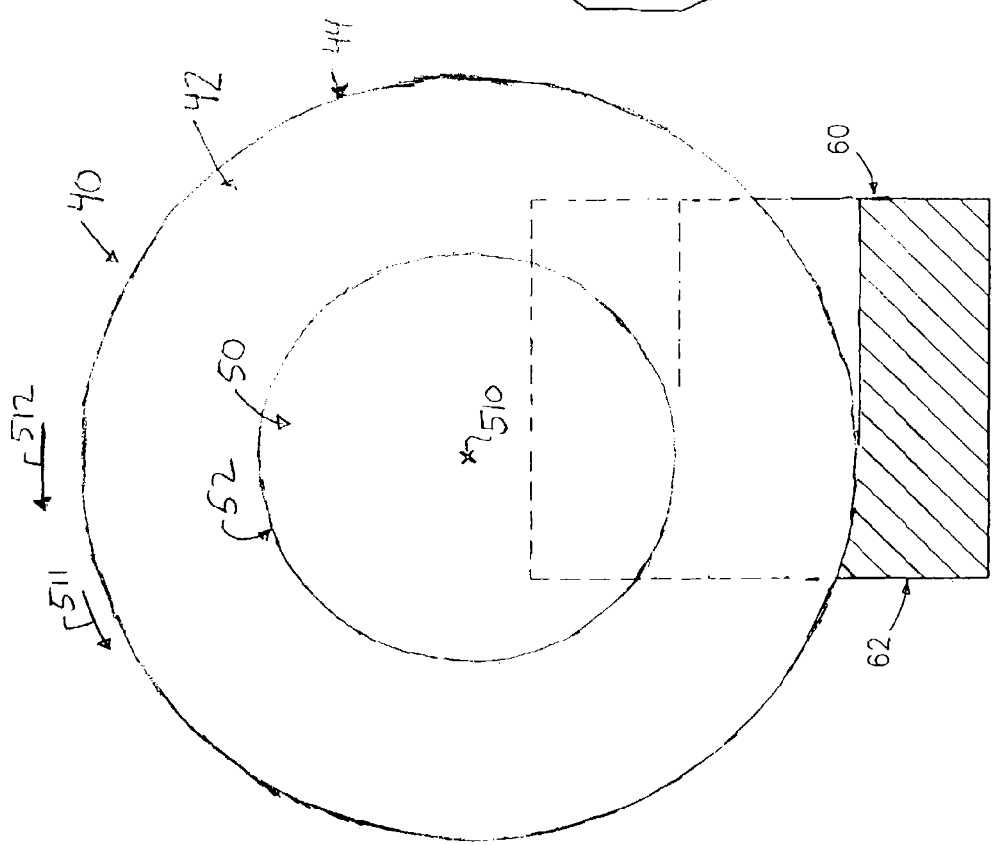
FIG. 3 is a radial cutaway view of the precursor of FIG. 2 during machining.

In an exemplary method of manufacture, a precursor of the final disk is initially formed with a substantially uninterrupted perimeter. Initial precursor slots 24' (FIG. 2) may be ground having an outboard portion between relatively widely spaced parallel sidewall surface portions 31A and 31B and an inboard portion with more closely spaced surface portions 32A and 32B. An essentially circumferential sidewall shoulder surface portion 34A, 34B separates these surface portions. A flat base surface 36 joins the surface portions 32A and 32B. FIG. 3 shows the initial slot precursor being ground by a grinding wheel 40 having a large diameter central portion 42 having a perimeter 44 for forming the base surface 36 and first and second sides for forming the surface portions 32A and 32B. The grinding wheel has a pair of smaller diameter portions 50 each having a perimeter 52 for forming an associated one of the surface portions 34A, 34B and an outboard side surface for forming the associated surface portion 30A, 30B. The wheel is driven for rotation about its central axis 510 in a direction 511 while being traversed in a longitudinal direction 512 to pass the wheel between first and second sides 60 and 62 of the disk.

Figure 4:
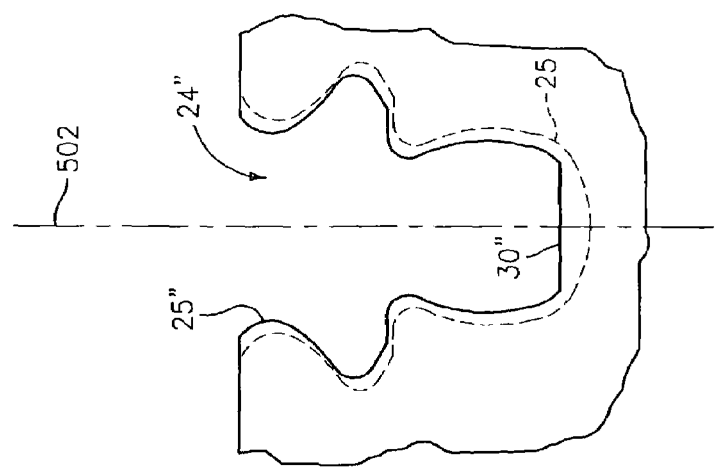
FIG. 4 is a view of a secondary precursor of the disk of FIG. 1.
Figure 5:
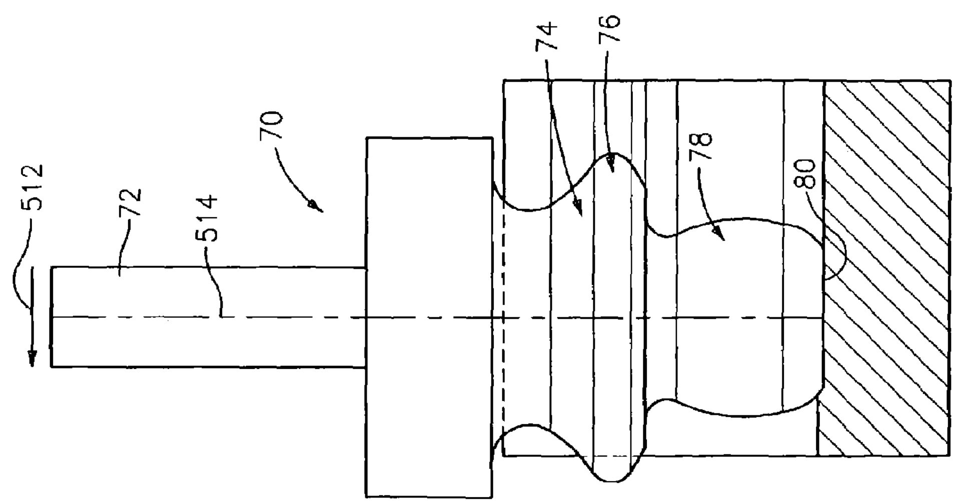
FIG. 5 is a radial cutaway view of the precursor of FIG. 2 during machining from the precursor of FIG. 2.

A convoluted secondary slot precursor 24" (FIG. 4) is then formed from each initial precursor 24'. In the exemplary embodiment, this is done using a superabrasive quill 70 (FIG. 5) driven for rotation about its central longitudinal axis 514 while being traversed in the direction 512. The exemplary quill has a shaft 72 for mounting in an associated milling machine (not shown) and a distal superabrasive coated tip 74. The tip is dimensioned with proximal and distal relatively wide portions 76 and 78 for forming associated portions of a surface 25" of the secondary slot precursor 24". The surface 25" is slightly toward the plane 502 relative to the ultimate surface 25. In the exemplary embodiment, the tip 74 includes a flat distal end 80 for forming a flat base portion 30" on surface 25" similarly slightly outboard of the ultimate base.

Figure 8:
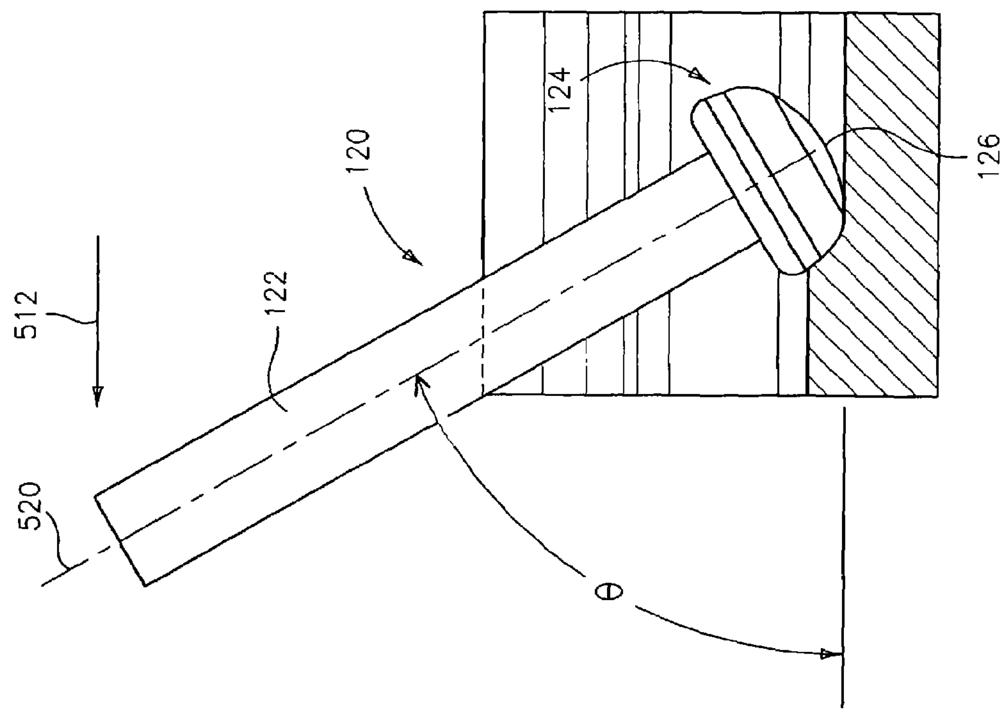
FIG. 8 is a radial cutaway view of the disk of FIG. 1 during machining from the precursor of FIG. 6.
Figure 6:
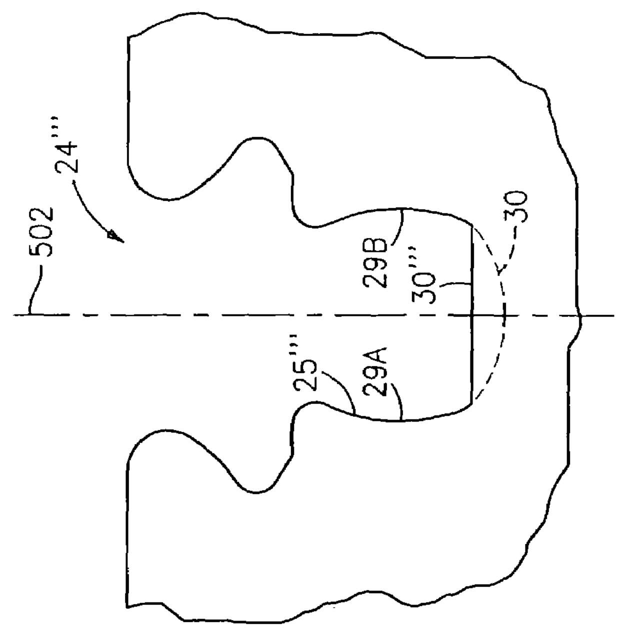
FIG. 6 is a view of a tertiary precursor of the disk of FIG. 1.
Figure 7:
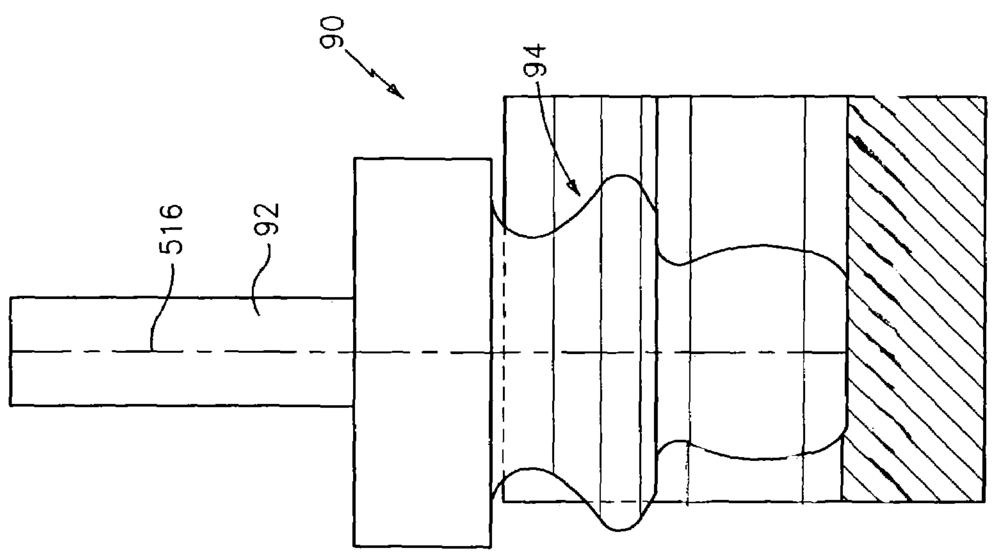
FIG. 7 is a radial cutaway view of the precursor of FIG. 6 during machining from the precursor of FIG. 4.

Each slot precursor 24" is, in turn, further enlarged to form a third precursor 24'" (FIG. 6). This is done using a second quill 90 having a shaft 92 and tip 94 and rotated about its axis 516 while being traversed in the direction 512 as was the quill 70. Relative to the tip 74 of the quill 70, the tip 94 has corresponding portions of slightly greater diameter and is slightly longer. The exemplary quill dimensions bring the surface 25'" into alignment with the ultimate surface 25 except at a flat base 30'" slightly outboard of the ultimate concave base 30. The base 30'" has abrupt intersections with the smooth surface portions 29A and 29B (being the same for the surface 25'" as for the surface 25). At least one additional machining stage is provided to form the surface portion 30 with its outwardly concave shape and smooth continuously curving transition to the adjacent portions 29A and 29B. This is achieved by means of a quill 120 having a shaft 122 and a superabrasive tip 124 and being rotated about its axis 520 while being traversed in the direction 512. Because the rotation produces zero movement at the center 126 of the distal end of the tip 124, the axis 520 is off-radial. FIG. 8 shows the axis at a non-right angle θ to the longitudinal direction or feed direction 512 and thus off-radial by the component of θ. With reference to the illustration of FIG. 8, the quill is defined as inclined relative to the feed direction for values of θ greater than zero and less than 90°. A decline is defined as θ values greater than 90° and less than 180°. In the exemplary embodiments, the axis 520 is off-radial by between 5° and 50° ($40° \leqq \theta \leqq 85°$), more narrowly, between 10° and 30° ($60° \leqq \theta \leqq 80°$).

One or more embodiments of the present invention have been described. Nevertheless, it will be understood that various modifications may be made without departing from the spirit and scope of the invention. For example, in alternate embodiments, the intermediate radial quill machining may not necessarily disturb the base of the initial slot precursor. This base may end up being effected only by the angled quill. Furthermore, the principles of the invention may be replied to a number of existing basic disk configurations and manufacturing techniques. In such implementations, features of the implementation would be influenced by features of the disks and techniques. Accordingly, other embodiments are within the scope of the following claims.

What is claimed is:

1. A method for cutting a blade root retention slot in a turbine engine disk element, the method comprising:

forming a precursor slot in the element, the precursor slot having first and second sidewalls and a base;

subsequent to said forming, machining a convoluted profile into the first and second sidewalls; and subsequent to said machining, passing a rotating bit through the precursor slot to machine said base, the bit rotating about an axis off-normal to a direction of said passing.

2. The method of claim 1 wherein said machining broadens and deepens the base.

3. The method claim 1 wherein the machining leaves at least a first portion of the base intact.

4. The method of claim 1 wherein the forming comprises machining with a grinding wheel rotating about a wheel axis essentially perpendicular to a direction of passing said grinding wheel and essentially circumferential to a central longitudinal axis of the disk element.

5. The method of claim 1 wherein the machining comprises machining with a profiling bit having a convoluted longitudinal profile complementary to said convoluted profile of said slot sidewalls.

6. The method of claim 1 wherein the passing smooths transitions between said first and second sidewalls and said base.

7. The method of claim 1 wherein during the passing, the bit axis essentially lies along a radial plane of the element at an angle of between 60° and 85° relative to said direction of said passing.

8. The method of claim 7 wherein during the passing the bit axis is inclined relative to said direction of said passing.

9. The method of claim 1 wherein the forming comprises machining with a grinding wheel having portions of different diameters for forming the precursor slot with said first and second sidewalls as stepped sidewalls.

10. The method of claim 1 wherein the passing increases an outward concavity of the base.

11. A method for cutting a blade root retention slot in a turbine engine disk element, the method comprising:

forming a precursor slot in the element, the precursor slot having first and second sidewalls and a base;

subsequent to said forming, passing a rotating bit through the precursor slot to machine said base, the bit rotating about an axis off-normal to a direction of said passing.

12. The method of claim 11 wherein:

the bit is an abrasive bit.

13. The method of claim 11 wherein:

the bit is an abrasive bit having a doubly convex surface portion used to machine said base.

14. The method of claim 11 wherein:

the forming comprises grinding with a grinding wheel.

15. The method of claim 11 wherein:

the forming comprises grinding with a series of grinding wheels of differing widths.

16. The method of claim 11 wherein:

the axis is between 5° and 30° off-normal to the direction of the passing.

17. The method of claim 16 wherein:

the axis is inclined relative to the direction of the passing.

* * * * *